(12) United States Patent
Asanuma

(10) Patent No.: US 6,192,066 B1
(45) Date of Patent: Feb. 20, 2001

(54) SPREAD SPECTRUM COMMUNICATION APPARATUS AND RAKE RECEIVER

(75) Inventor: Yutaka Asanuma, Yokohama (JP)

(73) Assignee: Kabushiki Kaisha Toshiba, Kanagawa-Ken (JP)

(*) Notice: Under 35 U.S.C. 154(b), the term of this patent shall be extended for 0 days.

(21) Appl. No.: 09/120,743

(22) Filed: Jul. 23, 1998

(30) Foreign Application Priority Data

Jul. 25, 1997 (JP) .................................................. 9-200312

(51) Int. Cl.[7] .................................................. H04B 15/00
(52) U.S. Cl. .................... 375/130; 375/136; 375/147; 375/152; 375/144; 375/148
(58) Field of Search .................... 375/130, 136, 375/142, 143, 147, 148, 144, 152, 316, 346, 348, 350

(56) References Cited

U.S. PATENT DOCUMENTS

| 5,361,276 | * | 11/1994 | Subramanian | 375/1 |
| 5,644,591 | * | 7/1997 | Sutton | 375/200 |
| 5,659,573 | * | 8/1997 | Bruckert et al. | 375/200 |
| 5,809,020 | * | 9/1998 | Bruckert et al. | 370/335 |

* cited by examiner

Primary Examiner—Stephen Chin
Assistant Examiner—Mohammad Ghayour
(74) Attorney, Agent, or Firm—Limbach & Limbach, LLP

(57) ABSTRACT

A RAKE receiver includes an arithmetic circuit for weighting coefficients. The arithmetic circuit obtains the signal power for each path from the reception amplitude on the path which is detected by a transmission path characteristics detector, and also obtains the interference powers from the reception amplitudes on two other paths which are respectively detected by transmission path characteristics detectors. The arithmetic circuit then calculates the weighting coefficients on the basis of the these signal powers and interference powers. The weighting coefficients are respectively supplied to weighting multipliers, thereby weighting the reception signals from the respective paths. A symbol synthesizer performs symbol synthesis of the resultant signals.

18 Claims, 5 Drawing Sheets

SPREAD SPECTRUM COMMUNICATION APPARATUS AND RAKE RECEIVER

BACKGROUND OF THE INVENTION

The present invention relates to a communication apparatus used in a digital mobile communication system such as a car/portable telephone system, a cordless telephone system, or a radio LAN system and, more particularly, to a spread spectrum communication apparatus for performing radio communication by using a code division multiple access (CDMA) scheme or a multicode transmission scheme.

Spread spectrum communication, which is resistant to interference and disturbance, has gained a great deal of attention as one of communication schemes used for a mobile communication system.

A spread spectrum communication system performs communication as follows. First of all, the transmitting communication apparatus modulates digital speech data or digital image data by digital modulation such as PSK modulation. The modulated data is converted into a broadband baseband signal by using spreading codes. The spread transmission signal is converted into an RF signal and is then transmitted. The receiving communication apparatus despreads the received RF signal by using the same spreading codes as those used in the transmitting communication apparatus. Digital demodulation is then performed for the despread reception signal by digital demodulation such as PSK demodulation, thereby reconstructing original data from reception data.

In a system of this type, a RAKE receiver is used as one of measures against multipath interference. In a radio communication system, the radio wave transmitted from the transmitting apparatus may directly arrive at the receiving apparatus, or may arrive at the receiving apparatus upon being reflected by a building, a mountain, and the like. If one radio wave reaches the receiving apparatus through a plurality of paths with different delay times, waveform distortion occurs. This phenomenon is called multipath effects.

According to spread spectrum communication, multipath radio signals received by one antenna with different delay times can be separated in units of spreading code length (chip interval). The received multipath signals are respectively input to a plurality of independent demodulators. These demodulators despread the signals with spreading codes of time phases corresponding to the respective paths. The despread reception signals from the respective paths are synthesized into symbols, reconstructing original data from reception data. This reception scheme is called RAKE reception because the receiver has a RAKE-like arrangement. With the use of a RAKE receive, path diversity is obtained. This can greatly improve the reception quality of the signal transmitted through a multipath transmission channel.

In a RAKE receiver, after delay units give different delay amounts to the multipath signals received by a radio circuit for the respective paths, multipliers multiply the resultant signals by the spreading codes generated by a spreading code generator, thereby separating the reception signals for the respective paths. These reception signals are integrated by integral damping filters for a 1-symbol interval. Synchronization and weighting are performed for the integral outputs, and the resultant output signals are synthesized. The above weighting is performed by determining weights in proportion to the amplitudes of the reception signals detected from the respective paths, and multiplying the integral outputs by the determined weights. In this RAKE receiver, therefore, the reception signals from a plurality of paths are subjected to maximum ratio synthesis. As a result, a maximum diversity gain can be obtained.

The following problems to be solved are, however, posed in this conventional RAKE receiver.

Assume that the reception signals from the respective paths are synthesized by maximum ratio synthesis. In this case, when noise superposed on the respective paths can be regarded as equipower white Gaussian noise, a maximum gain can be obtained. For example, in a CDMA mobile communication system, on the upstream channels from mobile stations PS-A, PS-B, and PS-C to a base station BS, waves A2, B1, B2, C1, and C2 become interference waves with respect to a desired wave A1, and the waves A1, B1, B2, C1, and C2 become interference waves with respect to the desired wave A2, as shown in FIG. 6. That is, on upstream channels in the CDMA mobile communication system, interference waves originating from many transmission sources arrive at the base station through various paths. For this reason, the interference waves superposed on all the paths practically become white Gaussian noise owing to the statistical multiplexing effect. If maximum ratio synthesis is performed in this state, a maximum gain can be obtained.

In contrast to this, when orthogonal codes are used as spreading codes on downstream channels from the base station BS to the mobile station PS-A as shown in FIG. 7, the signals propagating through the same path do not become interference waves, and only the signals propagating through other paths become interference waves. That is, as shown in FIG. 8, the waves A2, B2, and C3 become interference waves with respect to the desired wave A1, and the waves A1, B1, and C1 become interference waves with respect to the desired wave A2. For this reason, the interference waves superposed on the respective paths cannot be regarded as equipower white Gaussian noise.

When, therefore, the spread spectrum signal transmitted from one radio station is to be received by a terminal apparatus through a multipath transmission channel, the reception signal output from the RAKE receiver does not have an optimal desired-to-undesired signal ratio (D/U) even if maximum ratio synthesis is performed.

The above problems may arise even in a spread spectrum communication system for performing so-called multicode transmission, i.e., transmitting data from one radio station to another radio station by using a bundle of channels using different spreading codes.

BRIEF SUMMARY OF THE INVENTION

The present invention has been made in consideration of the above situation, and has as its object to provide a RAKE receiver that can always obtain a high desired-to-undesired signal ratio even if the spread spectrum signal transmitted from one radio station is received through a multipath transmission channel, and a spread spectrum communication apparatus including the RAKE receiver.

In order to achieve the above object, a RAKE receiver and a spread spectrum communication apparatus according to the present invention each include a weighting coefficient generating means as a constituent element for RAKE reception. The weighting coefficient generating means obtains a reception signal power for each path of a multipath transmission channel and interference powers from the remaining paths, and generates weighting coefficients for equalizing the interference powers contained in the reception signals from the respective paths on the basis of the reception signal powers and the interference powers. The reception signals from the respective paths are weighted on the basis of the generated weighting coefficients. The weighted reception signals from the respective paths are synthesized.

According to the present invention, therefore, when the spread spectrum signal transmitted from one radio station is to be RAKE-received through a multipath transmission channel, a weighting coefficient for each of a plurality of paths is obtained in consideration of not only the signal power on the path of interest but also the interference powers from the remaining paths. The reception signals from the respective paths are then weighted on the basis of the obtained weighting coefficients. With this operation, optimal weighting processing can be performed for the reception signals from the respective paths to equalize the interference powers contained in the reception signals from the respective paths even if the interference powers applied from other paths to each path cannot be regarded as equipower white Gaussian noise as in a case in which a spread spectrum signal is transmitted from a base station to a mobile station in a CDMA mobile communication system through a multipath transmission channel. An optimal desired-to-undesired signal ratio can therefore be obtained as compared with the conventional system in which the reception signals from the respective paths are synthesized by maximum ratio synthesis.

The same effect as described above can be obtained when the present invention is applied to a multicode transmission system for concurrently transmitting data is from one radio station to the other radio station by using a plurality of radio carriers using different spreading codes.

In addition, the present invention is characterized in that the weighting coefficient generating means obtains a reception signal power for each path of a multipath transmission channel, a power corresponding to thermal noise contained in the reception signal from the path, and an interference power from another path, and generates weighting coefficients for equalizing the thermal noise and interference powers contained in the reception signals from the respective paths on the basis of the reception signal powers, the thermal noise powers, and the interference powers.

With this arrangement, a weighting coefficient for each path is calculated in consideration of thermal noise powers in addition to the signal power on the path and the interference powers from the remaining paths. Even if, therefore, the reception signals from the respective paths contain different thermal noise powers, the interference powers containing the thermal noise can be equalized among the paths. With this operation, when maximum ratio synthesis is performed, a reception signal with a higher desired-to-undesired signal ratio can be obtained.

The present invention is further characterized in that the weighting coefficient generating means obtains a reception signal power for each path of a multipath transmission channel, a first interference power from another path, and a second interference power from a second communication apparatus other than the first communication apparatus, and generates weighting coefficients for equalizing the interference powers contained in the reception signals from the respective paths on the basis of the reception signal powers and the first and second interference powers.

With this arrangement, a weighting coefficient for each path is calculated in consideration of, for example, intercell interference powers or interference powers from other radio stations in addition to the signal power on the path and the interference powers from the remaining paths. In a system like a cellular radio system in which a given cell may receive interference from other cells, optimal weighting for each path can be performed in accordance with the actual situation, thereby obtaining a reception signal with a higher desired-to-undesired signal ratio.

Furthermore, the present invention is characterized by comprising one arithmetic circuit, and time-divisionally calculating weighting coefficients for all paths by using the arithmetic circuit. With this arrangement, a plurality of arithmetic circuits need riot be used. This simplifies and miniaturizes the circuit arrangement.

The present invention is also characterized by comprising arithmetic circuits corresponding to the number of paths, and concurrently calculating weighting coefficients for the respective paths by using the arithmetic circuits. With this arrangement, the time required to calculate weighting coefficients for all the paths can be shortened, and the processing speed can be increased.

Additional objects and advantages of the invention will be set forth in the description which follows, and in part will be obvious from the description, or may be learned by practice of the invention. The object and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate a presently preferred embodiment of the invention and together with the general description given above and the detailed description of the preferred embodiment given below, serve to explain the principles of the invention.

DETAILED DESCRIPTION OF THE INVENTION (First Embodiment)

Figure 1:
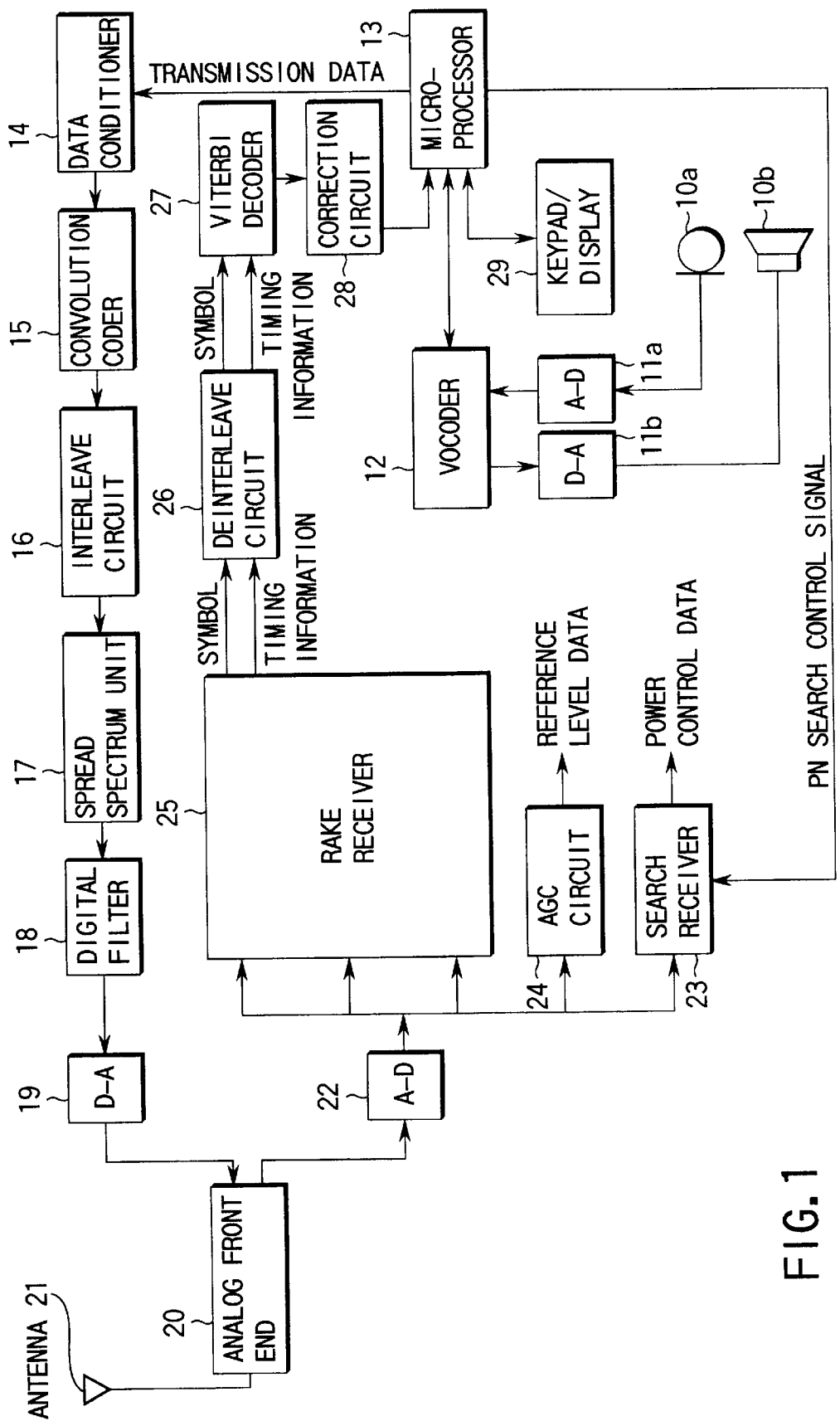
FIG. 1 is a block diagram showing a mobile communication apparatus including a RAKE receiver according to the first embodiment of the present invention.

FIG. 1 is a block diagram showing a mobile communication apparatus including a RAKE receiver according to the first embodiment of the present invention.

A transmission speech signal of a speaker output from a microphone 10a is converted into a digital signal by an analog-to-digital converter (A-D) 11a. The digital signal is then coded by a voice coder-decoder (to be referred to as a vocoder hereinafter) 12. A microprocessor (MPU) 13 adds a control signal and the like to the coded transmission signal output from the vocoder 12 to generate transmission data.

A data conditioner 14 adds an error detection code and an error correction code to this transmission data. A convolution coder 15 then codes the data. An interleave circuit 16 performs interleave processing for the data. The transmission data output from the interleave circuit 16 is spread to a broadband signal with spreading codes by a spread spectrum unit 17. As the spreading codes, for example, a PN code (pseudo noise code) and an orthogonal code using a Walsh sequence, an Orthogonal Gold sequence, or the like are used together. The orthogonal code is used to improve the orthogonality between channels so as to further suppress interference.

A digital filter 18 removes unwanted frequency components from this spread spectrum transmission signal. The resultant signal is converted into an analog signal by a digital-to-analog converter (D-A) 19. This analog transmission signal is up-converted into a predetermined radio frequency and power-amplified to a predetermined transmission power level by an analog front end 20. Thereafter, the transmission signal is transmitted from an antenna 21 to, for example, a base station.

The spread spectrum radio signal received by the antenna 21 is amplified by a low-noise amplifier in the analog front end 20 and is also down-converted into an intermediate or baseband frequency. The reception signal output from the analog front end 20 is converted into a digital signal at a predetermined sampling period by an analog-to-digital converter (A-D) 22. The digital signal is then input to a search receiver 23, an automatic gain control (AGC) circuit 24, and a RAKE receiver 25.

The RAKE receiver 25 includes three finger circuits for separating the signals received through three different paths from a multipath radio signal and reconstructing original signals from the respective reception signals, and a symbol synthesizer for synthesizing symbols from the output signals from these finger circuits.

The search receiver 23 searches for the PN code of the pilot signal broadcast from a base station, and acquires the offset of the code. The search receiver 23 basically has the same arrangement as that of the finger circuit. The power control data obtained by this PN code search is loaded into the microprocessor 13.

The demodulated symbol output from the RAKE receiver 25 is input to a deinterleave circuit 26, together with timing information. The deinterleave circuit 26 performs deinterleave processing. Subsequently, the demodulated symbol having undergone this deinterleave processing is Viterbi-decoded by a Viterbi decoder 27. The demodulated symbol having undergone this Viterbi decoding is subjected to error correction decoding in an error correction circuit 28 to become received data. This data is input to the microprocessor 13. The microprocessor 13 separates the input received data into speech data and control data. The speech data is voice-decoded by the vocoder 12 and is converted into an analog signal by a digital-to-analog converter (D-A) 11b. The analog signal is then output as an audible sound from a loudspeaker 10b.

A keypad/display 29 is used by the user to input dial data, control data, and the like or to display various pieces of information associated with the operation state of the mobile station. The operation of the keypad/display 29 is controlled by the microprocessor 13.

Figure 2:
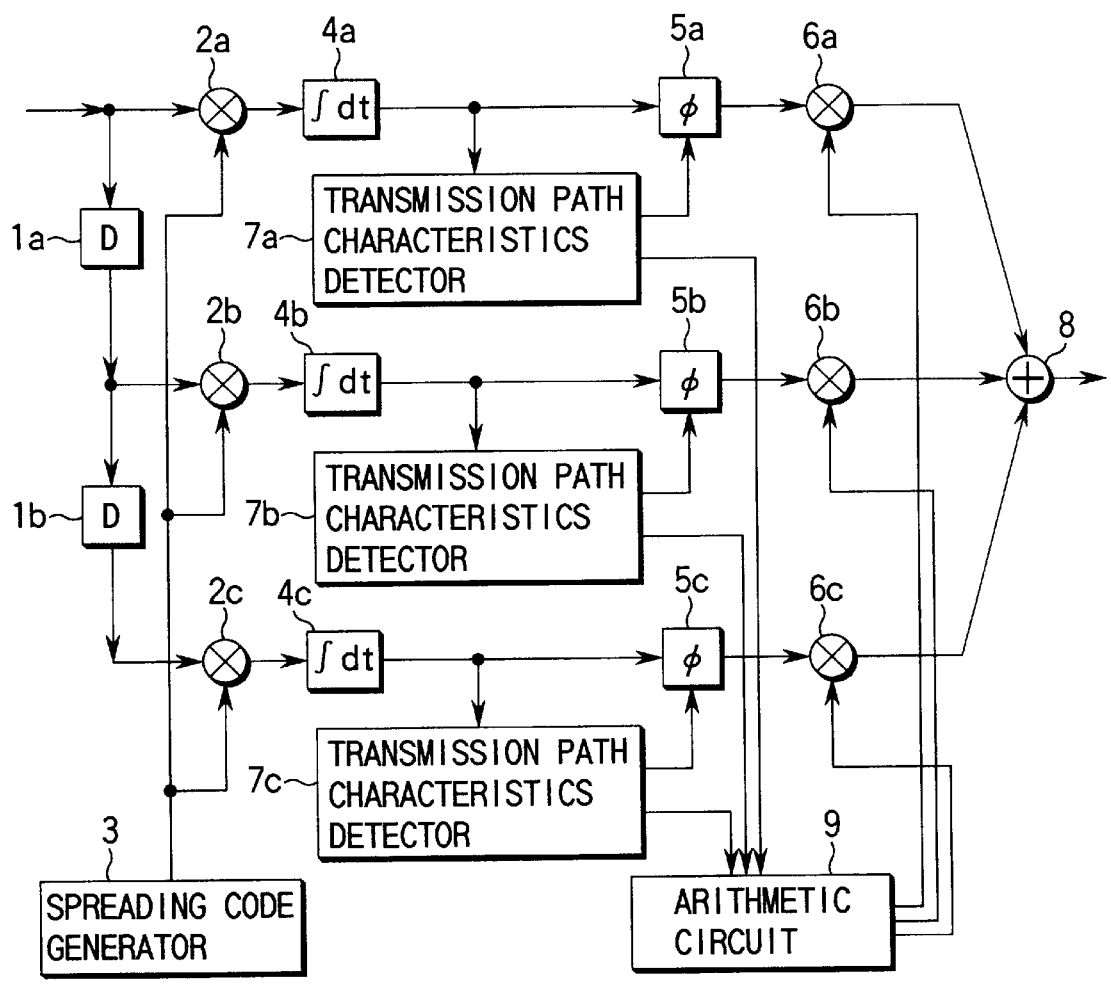
FIG. 2 is a block diagram showing the arrangement of the RAKE receiver of the mobile communication apparatus in FIG. 1.

The RAKE receiver 25 has the following arrangement. FIG. 2 is a circuit block diagram showing the arrangement of the RAKE receiver 25, and more specifically, the arrangement for a case in which the radio signals transmitted through three paths are to be synthesized.

Referring to FIG. 2, the multipath reception signals that have been received through the antenna (not shown) and have undergone down-conversion of the frequencies in the radio unit are respectively input to multipliers 2a, 2b, and 2c for spread spectrum after different delay amounts are given to the signals by delay units 1a and 1b. These multipliers 2a, 2b, and 2c respectively multiply the above multipath reception signals by the spreading codes generated by a spreading code generator 3. With this operation, the reception signals from the respective paths are separated. These reception signals are respectively integrated by integral damping filters 4a, 4b, and 4c for a 1-symbol interval. The resultant integral outputs are respectively input to weighting multipliers 6a, 6b, and 6c through phase shifters 5a, 5b, and 5c.

The above integral outputs are also input to transmission channel characteristics detectors 7a, 7b, and 7c, respectively. The transmission channel characteristics detectors 7a, 7b, and 7c detect pieces of amplitude information and phase difference information as the transmission channel characteristics of the respective paths. The pieces of phase difference information are supplied to the phase shifters 5a, 5b, and 5c. The phase shifters 5a, 5b, and 5c perform phase adjustment to match the phases of the respective integral outputs with each other in accordance with the pieces of phase difference information.

The pieces of amplitude information of paths P1, P2, and P3 which are detected by the transmission channel characteristics detectors 7a, 7b, and 7c are input to an arithmetic circuit 9. The arithmetic circuit 9 calculates weighting coefficients for the respective paths P1, P2, and P3 on the basis of the pieces of amplitude information of the paths P1, P2, and P3, detected by the transmission channel characteristics detectors 7a, 7b, and 7c, and supplies the calculated weighting coefficients to the weighting multipliers 6a, 6b, and 6c. Each weighting coefficient is calculated by using not only the amplitude information of a corresponding one of the paths P1, P2, and P3 but also the pieces of amplitude information of the two remaining paths.

Letting R1, R2, and R3 be the amplitudes detected on the respective paths P1, P2, and P3 by the transmission channel characteristics detectors 7a, 7b, and 7c, weighting coefficients W1, W2, and W3 for the paths P1, P2, and P3 are given by $$W1 = f(R1, R2, R3)$$

$$W2 = f(R2, R3, R1)$$

$$W3 = f(R3, R1, R2)$$

where f( ) is a function.

Note that if the function is represented by $$f(x,y,z) = x/\sqrt{(x \times x + y \times y + z \times z)}$$

path diversity synthesis becomes maximum ratio synthesis because the transmission channel characteristics of the respective paths P1, P2, and P3 are proportional to the weighting coefficients. This function is equivalent to division of the reception power of each path of interest by the total reception power. However, the ratios between the weighting coefficients for the respective paths P1, P2, and P3 are equal to the ratios between the reception powers of the paths P1, P2, and P3.

In contrast to this, according to the first embodiment of the present invention, the arithmetic circuit 9 obtains the signal power for each path on the basis of the amplitude of the signal from the path of interest, and also obtains the interference power for each path on the basis of the amplitudes of the signals from the remaining paths. The arithmetic circuit 9 then obtains a weighting coefficient for each path of interest in accordance with these calculation results.

Letting n be the number of paths, and r1, r2, ..., ri, ..., rn be the amplitudes of the transmission channel characteristics of the respective paths, weighting coefficients w1, w2, ..., wi, ..., wn are given by $$wi = A \cdot \frac{ri}{\sqrt{\frac{m}{PG}\left(\sum_{j=1}^{n} rj^2 - ri^2\right)}} \quad (1)$$

where A is the proportional constant, m is the number of mobile stations or multicodes, and PG is the spread factor.

With this arrangement, when, for example, the reception signals from the paths P1, P2, and P3 are separated by the respective finger circuits of the RAKE receiver 25, the transmission channel characteristics detectors 7a, 7b, and 7c respectively detect pieces of phase difference information and amplitude information of the reception signals from the paths P1, P2, and P3. The phase shifters 5a, 5b, and 5c then perform phase adjustment in accordance with the pieces of phase difference information.

The pieces of amplitude information detected by the transmission channel characteristics detectors 7a, 7b, and 7c are input to the arithmetic circuit 9.

The arithmetic circuit 9 calculates the weighting coefficients w1, w2, and w3 for the respective paths P1, P2, and P3 according to equation (1). For example, for the path P1, the signal power of the signal from the path P1 is obtained from the amplitude r1 of the reception signal from the path P1, and the interference power is then obtained from the amplitudes r2 and r3 of the reception signals from the two remaining paths P2 and P3. The optimal weighting coefficient w1 for the path P1 is calculated on the basis of these calculated signal power and interference power.

For each of the remaining paths P2 and P3, the signal power is obtained from the amplitude of the reception signal from the corresponding path, and the interference power for each path is obtained from the amplitudes of the reception signals form the two remaining paths in the same manner as described above. The weighting coefficients w2 and w3 are then calculated on the basis of these signal powers and interference powers.

The weighting coefficients w1, w2, and w3 obtained in this manner are respectively supplied from the arithmetic circuit 9 to the weighting multipliers 6a, 6b, and 6c. The weighting multipliers 6a, 6b, and 6c weight the integral outputs from the phase shifters 5a, 5b, and 5c with the above weighting coefficients w1, w2, and w3. The weighted reception signals from the respective paths are synthesized into symbols by a symbol synthesizer 8. The resultant signal is used to decode the reception data.

As described above, the first embodiment includes the arithmetic circuit 9 for weighting coefficients. This arithmetic circuit 9 obtains the signal power for each path from the amplitude of the reception signal from the corresponding path, and also obtains the interference power from the amplitudes of the reception signals from the two remaining paths. The arithmetic circuit 9 then calculates the weighting coefficients w1, w2, and w3 on the basis of the signal powers and the interference powers.

Even if, therefore, different interference powers act on the respective paths and hence cannot be regarded as white noise as in the case of upstream channels in a CDMA system, optimal weighting can be performed for each path in consideration of not only the signal power but also the interference power. With this, a reception signal having a high desired-to-undesired signal ratio (D/U) can be obtained.

Figure 3:
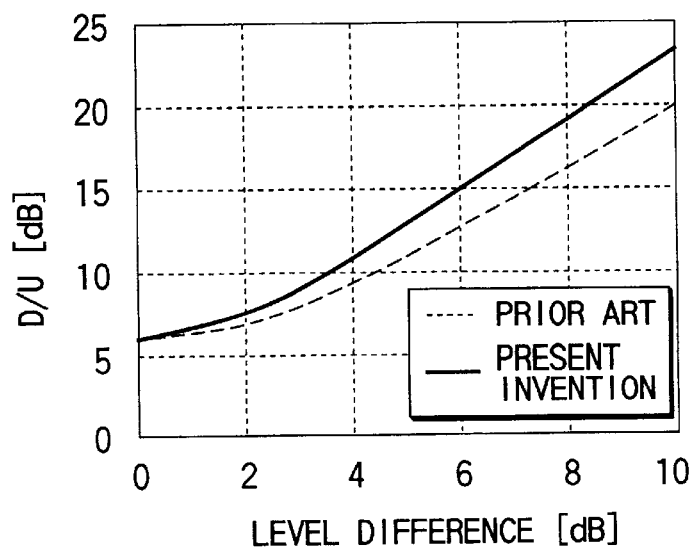
FIG. 3 is a graph showing D/U characteristics representing the effect obtained by the RAKE receiver in FIG. 2.

FIG. 3 shows the relationship between the level ratio between two paths and the desired-to-undesired signal ratio (D/U) in a case in which signals are received by using the RAKE receiver in the present invention in comparison with a conventional maximum ratio synthesis method. As is obvious from FIG. 3, the scheme of the present invention can obtain better D/U characteristics than the conventional maximum ratio synthesis method.

The above effects can be obtained in a spread spectrum communication system having a plurality of radio stations distributed, in which an arbitrary radio station performs multicode transmission of data to another radio station through a multipath transmission channel.

(Second Embodiment)

In the first embodiment described above, weighting is performed in consideration of the signal power on each path and the interference powers from the remaining paths. Considering the actual application environment for a CDMA mobile communication system, the "intercell interference+thermal noise" power must also be taken into consideration.

In the second embodiment, therefore, weighting coefficients for the respective paths are obtained in consideration of the above "intercell interference+thermal noise" as well. More specifically, letting N be the "intercell interference+thermal noise" power, the equation used in an arithmetic circuit 9 is expressed as $$wi = A \cdot \frac{ri}{\sqrt{\frac{m}{PG}\left(\sum_{j=1}^{n} rj^2 - ri^2\right) + N}} \quad (2)$$

According to this equation, the "intercell interference+thermal noise" power N can be approximately estimated by obtaining the interference power in the cell from the number of mobile stations in the cell and subtracting the interference power from the total reception power obtained from the antennas of the mobile stations. Alternatively, the power N may be set in advance on the basis of logic values or measured values. With this setting, the computation amount of the arithmetic circuit 9 can be reduced. In addition, the "intercell interference+thermal noise" N may be multiplied by a predetermined coefficient α (for example, α=0.5 to 1.5) in consideration of the differences in temporal variation characteristics of "intra-cell interference" and "intercell interference+thermal noise".

In a spread spectrum communication system in which multicode transmission of data is performed between two radio stations, equation (2) can be used or one radio station without any modification by setting the "intercell interference+thermal noise" power from the other radio station to N.

According to the second embodiment, when the arithmetic circuit 9 is to calculate the weighting coefficient for each path, noise power based on intercell interference or interference from the other radio station and thermal noise is taken into consideration, as well as the signal power on each path and the interference power from the other path. In a system that is vulnerable to interference from other cells like a cellular radio station, optimal weighting can be performed for each cell in accordance with the actual situation, thereby obtaining a reception signal with a higher D/U ratio.

(Other Embodiments)

Figure 4:
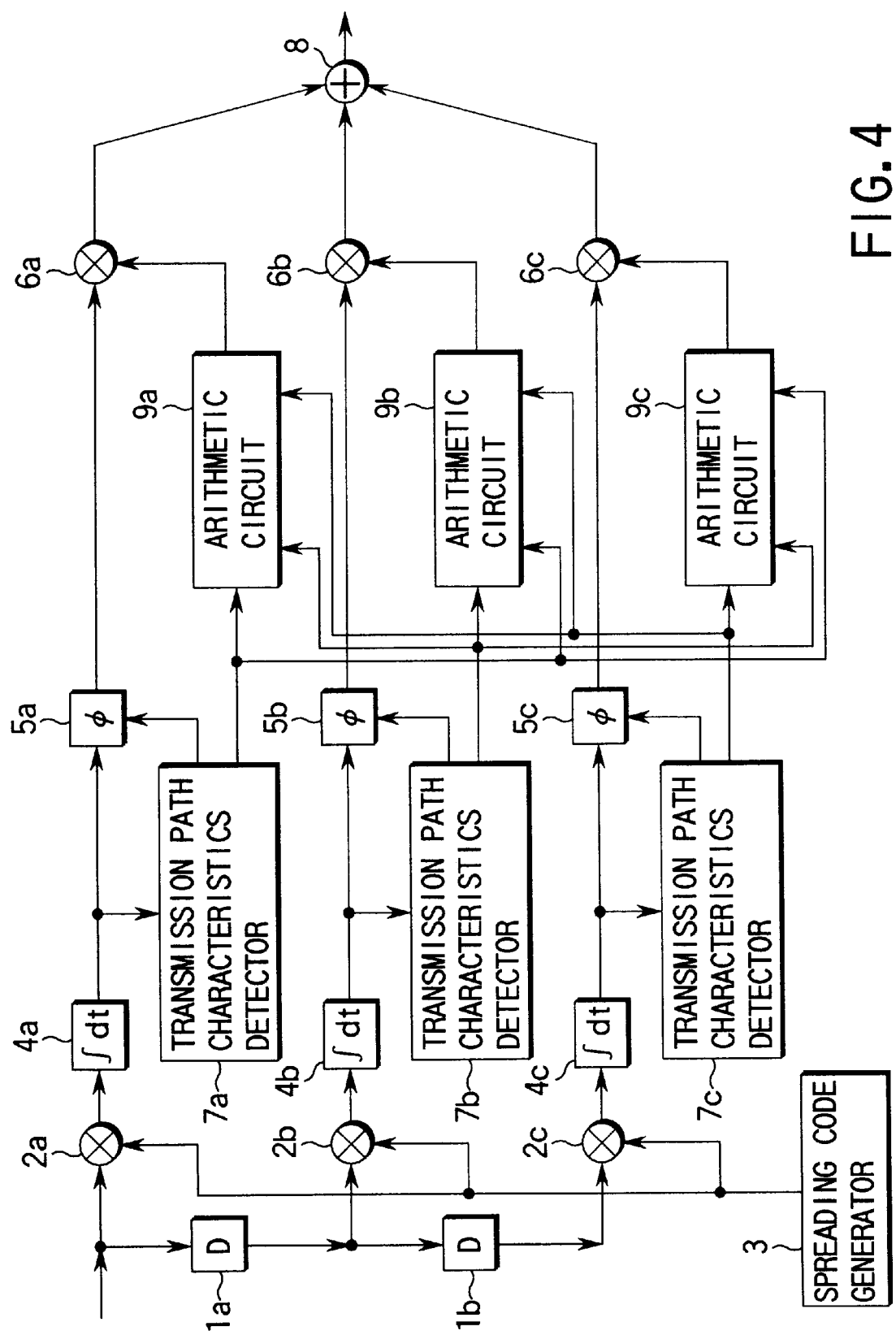
FIG. 4 is a block diagram showing a RAKE receiver according to the second embodiment of the present invention.
Figure 5:
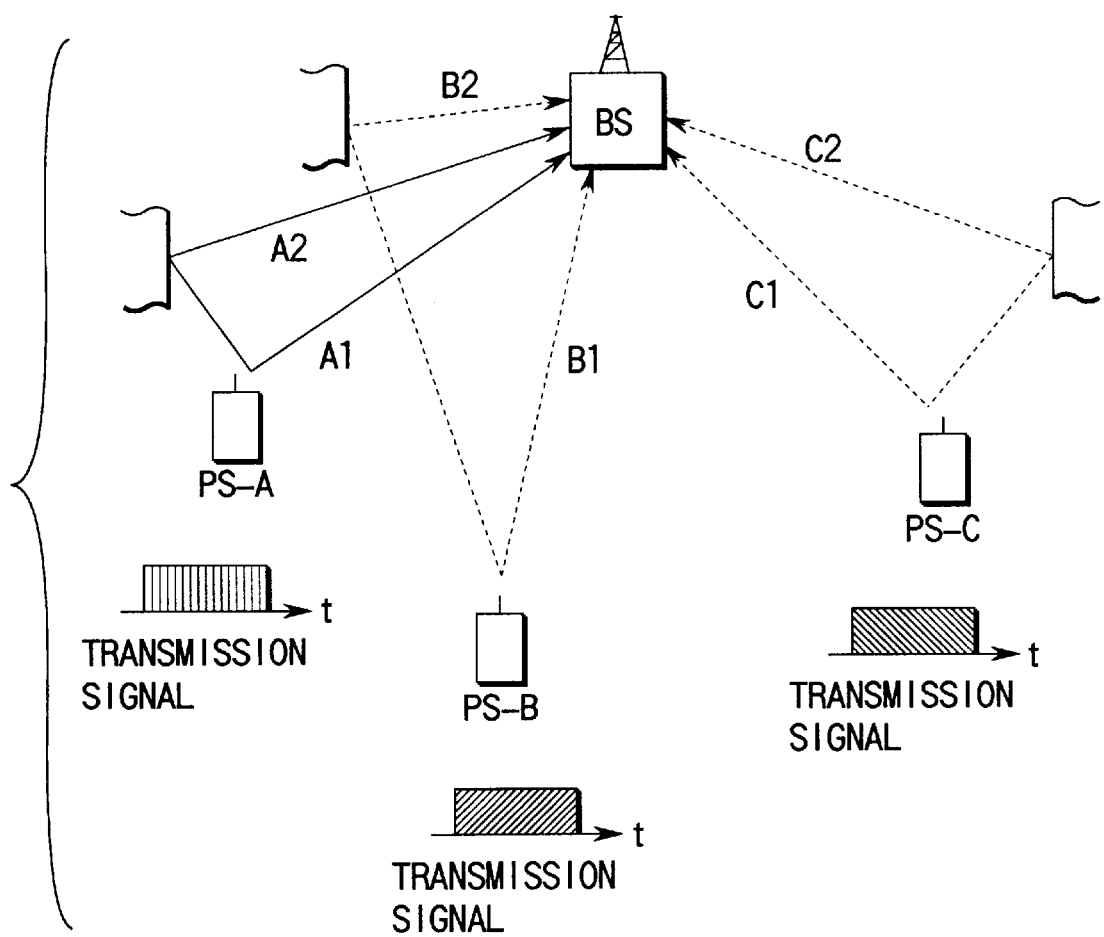
FIG. 5 is a view showing an example of how desired waves and interference waves propagate from mobile stations to a base station through upstream channels.
Figure 6:
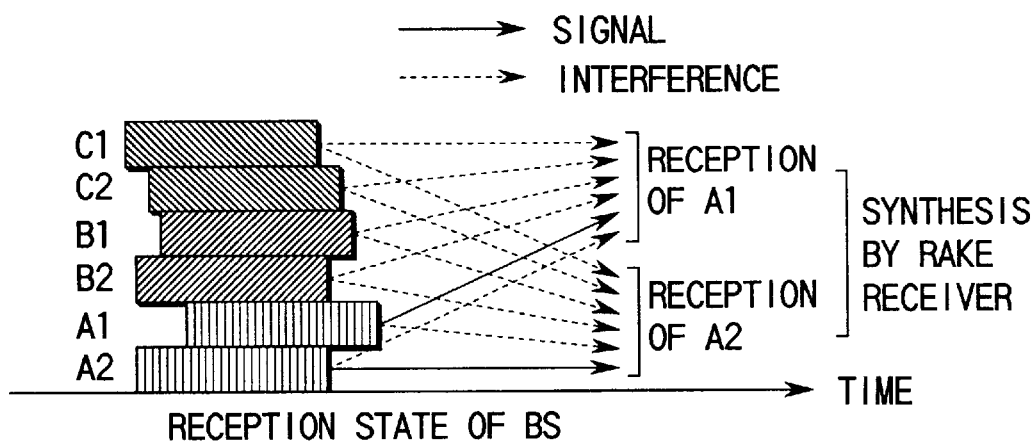
FIG. 6 is a view showing how the desired waves and the interference waves are received in the base station.
Figure 7:
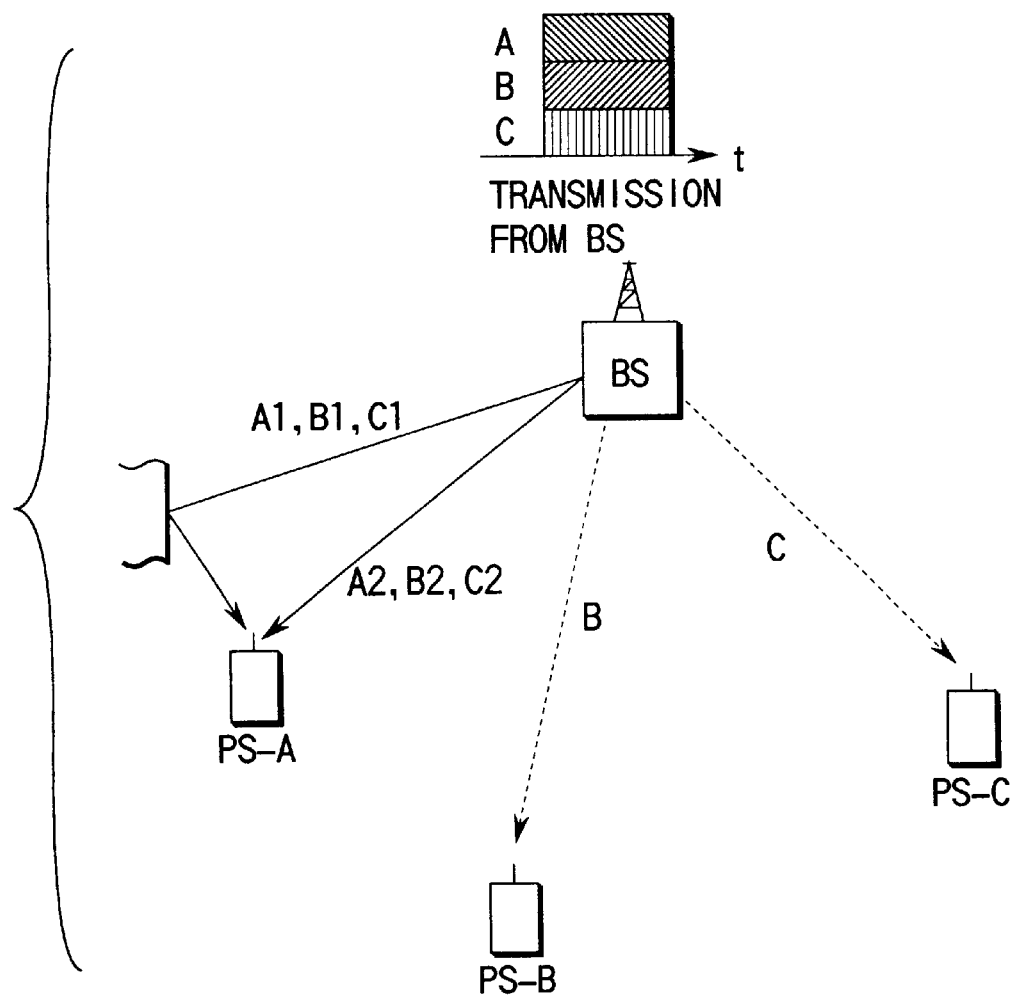
FIG. 7 is a view showing an example of how desired waves and interference waves propagate from the base station to the mobile stations through downstream channels.
Figure 8:
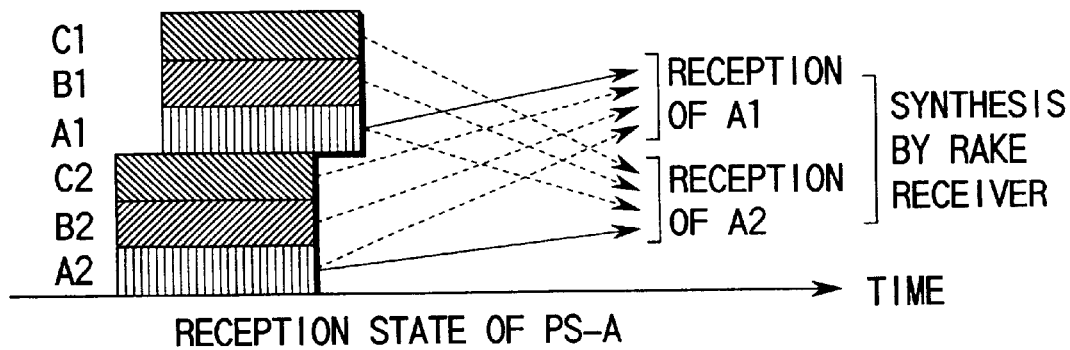
FIG. 8 is a view showing how the desired waves and the interference waves are received in a mobile station.

The present invention is not limited to the above embodiments. For example, in the first embodiment, one arithmetic circuit 9 is shared among the finger circuits corresponding to the respective paths, and this arithmetic circuit 9 calculates the weighting coefficients for the respective paths by time-division processing. As shown in FIG. 4, however, arithmetic circuits 9a, 9b, and 9c may be arranged for the respective finger circuits corresponding to the respective paths to independently calculate the weighting coefficients for the respective paths. With this arrangement, weighting coefficients can be calculated at high speed without using any high-speed arithmetic circuit as compared with the circuit (FIG. 2) in the first embodiment.

In each embodiment described above, the arithmetic circuit 9 is arranged independently of the respective finger circuits. However, the phase shifters 5a, 5b, and 5c, the weighting multipliers 6a, 6b, and 6c, and the arithmetic circuit 9 may be integrated into a DSP (Digital Signal Processor), and phase adjustment, calculation of weighting coefficients, and weighting/multiplying processing may be performed by the DSP.

Obviously, the above arithmetic circuit may be formed by an LSI together with or independently of the phase shifters 5a, 5b, and 5c and the weighting multipliers 6a, 6b, and 6c.

In the second embodiment, the weighting coefficients for the respective paths are obtained in consideration of "intercell interference+thermal noise". However, in a mobile communication system including only one base station, intercell interference need not be taken into consideration. In this system, therefore, the weighting coefficients for the respective paths may be obtained in consideration of only thermal noise.

In addition, the arrangement of the RAKE receiver, the arrangement and arithmetic processing contents of the arithmetic circuit, the type and arrangement of communication apparatus using the RAKE receiver, and the type and arrangement of communication system to which the present invention is to be applied can be variously modified within the spirit and scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A RAKE receiver for receiving a signal, which is transmitted after the signal has undergone spread spectrum with orthogonal codes in a first communication apparatus, through a multipath transmission channel including a plurality of paths, comprising:

weighting coefficient generating means for obtaining a reception signal power for each path of the multipath transmission channel and an interference power from another path, and generating weighting coefficients for equalizing the interference powers contained in the reception signals from the respective paths on the basis of the reception signal powers and the interference powers;

weighting means for weighting the reception signals from the respective paths on the basis of the weighting coefficients generated for the respective paths by said weighting coefficient generating means; and synthesizing means for synthesizing the reception signals from the respective paths which are weighted by said weighting means.

2. A RAKE receiver according to claim 1, wherein said weighting coefficient generating means calculates weighting coefficients w1, w2, . . . , wi, . . . , wn for the respective paths according to $$wi = A \cdot \frac{ri}{\sqrt{\frac{m}{PG}\left(\sum_{j=1}^{n} rj^2 - ri^2\right)}}$$

where r1, r2, . . . , ri, . . . , rn are the amplitudes of transmission channel characteristics of n paths, m is the number of RAKE receivers for receiving signals transmitted from said first communication apparatus, PG is the spread factor of the spread spectrum, and A is a proportionality constant.

3. A RAKE receiver according to claim 1, wherein said weighting coefficient generating means comprises one arithmetic circuit and time-divisionally calculates weighting coefficients for all paths by using said arithmetic circuit.

4. A RAKE receiver according to claim 1, wherein said weighting coefficient generating means comprises arithmetic circuits corresponding to the number of paths, and concurrently calculates weighting coefficients for the respective paths by using said arithmetic circuits.

5. A RAKE receiver according to claim 1, wherein said weighting coefficient generating means obtains a reception signal power for each path of the multipath transmission channel, a power corresponding to thermal noise contained in the reception signal from the path, and an interference power from another path, and generates weighting coefficients for equalizing the thermal noise and interference powers contained in the reception signals from the respective paths on the basis of the reception signal powers, the thermal noise powers, and the interference powers.

6. A RAKE receiver according to claim 1, wherein said weighting coefficient generating means obtains a reception signal power for each path of the multipath transmission channel, a first interference power from another path, and a second interference power from a second communication apparatus other than said first communication apparatus, and generates weighting coefficients for equalizing the interference powers contained in the reception signals from the respective paths on the basis of the reception signal powers and the first and second interference powers.

7. A RAKE receiver according to claim 1, wherein said weighting coefficient generating means obtains a reception signal power for each path of the multipath transmission channel, a thermal noise power contained in the reception signal from the path, an interference power from another path, and a second interference power from a second communication apparatus other than said first communication apparatus, and generates weighting coefficients for equalizing the thermal noise and interference powers contained in the reception signals from the respective paths on the basis of the obtained reception signal powers, thermal noise powers, and first and second interference powers.

8. A RAKE receiver according to claim 7, wherein said weighting coefficient generating means calculates weighting coefficients w1, w2, . . . , wi, . . . , wn for the respective paths according to $$wi = A \cdot \frac{ri}{\sqrt{\frac{m}{PG}\left(\sum_{j=1}^{n} rj^2 - ri^2\right)} + N}$$

where r1, r2, . . . , ri, . . . , rn are the amplitudes of transmission channel characteristics of n paths, m is the number of RAKE receivers for receiving signals transmitted from said first communication apparatus, PG is the spread factor of the spread spectrum, A is a proportionality constant, and N is the thermal noise and second interference powers.

9. A RAKE receiver according to claim 8, wherein said weighting coefficient generating means multiplies the thermal noise and second interference powers N by a coefficient a for correcting temporal variation characteristics of the powers N.

10. A spread spectrum communication apparatus for receiving a signal, which is transmitted after the signal has undergone spread spectrum with orthogonal codes in a first communication station, through a multipath transmission channel including a plurality of paths, comprising at least:
a RAKE receiving section for receiving the signal transmitted from said first communication station; and
a data reconstructing section for reconstructing transmitted information by demodulating and decoding a reception signal output from said RAKE receiving section, said RAKE receiving section including:
weighting coefficient generating means for obtaining a reception signal power for each path of the multipath transmission channel and an interference power from another path, and generating weighting coefficients for equalizing the interference powers contained in the reception signals from the respective paths on the basis of the reception signal powers and the interference powers;
weighting means for weighting the reception signals from the respective paths on the basis of the weighting coefficients generated for the respective paths by said weighting coefficient generating means; and
synthesizing means for synthesizing the reception signals from the respective paths which are weighted by said weighting means, and outputting the synthesized signal to said data reconstructing section.

11. An apparatus according to claim 10, wherein said weighting coefficient generating means of said RAKE receiving section calculates weighting coefficients w1, w2, . . . , wi, . . . , wn for the respective paths according to $$wi = A \cdot \frac{ri}{\sqrt{\frac{m}{PG}\left(\sum_{j=1}^{m} rj^2 - ri^2\right)}}$$

where r1, r2, . . . , ri, . . . , rn are the amplitudes of transmission channel characteristics of n paths, m is the number of spread spectrum communication apparatuses for receiving signals transmitted from said first communication station, PG is the spread factor of the spread spectrum, and A is a proportionality constant.

12. An apparatus according to claim 10, wherein said weighting coefficient generating means of said RAKE receiving section comprises one arithmetic circuit and time-divisionally calculates weighting coefficients for all paths by using said arithmetic circuit.

13. An apparatus according to claim 10, wherein said weighting coefficient generating means of said RAKE receiving section comprises arithmetic circuits corresponding to the number of paths, and concurrently calculates weighting coefficients for the respective paths by using said arithmetic circuits.

14. An apparatus according to claim 10, wherein said weighting coefficient generating means of said RAKE receiving section obtains a reception signal power for each path of the multipath transmission channel, a power corresponding to thermal noise contained in the reception signal from the path, and an interference power from another path, and generates weighting coefficients for equalizing the thermal noise and interference powers contained in the reception signals from the respective paths on the basis of the reception signal powers, the thermal noise powers, and the interference powers.

15. An apparatus according to claim 10, wherein said weighting coefficient generating means of said RAKE receiving section obtains a reception signal power for each path of the multipath transmission channel, a first interference power from another path, and a second interference power from a second communication station other than said first communication station, and generates weighting coefficients for equalizing the interference powers contained in the reception signals from the respective paths on the basis of the reception signal powers and the first and second interference powers.

16. An apparatus according to claim 10, wherein said weighting coefficient generating means of said RAKE receiving section obtains a reception signal power for each path of the multipath transmission channel, a thermal noise power contained in the reception signal from the path, an interference power from another path, and a second interference power from a second communication station other than said first communication station and generates weighting coefficients for equalizing the thermal noise and interference powers contained in the reception signals from the respective paths on the basis of the obtained reception signal powers, thermal noise powers, and first and second interference powers.

17. An apparatus according to claim 16, wherein said weighting coefficient generating means of said RAKE receiving section calculates weighting coefficients w1, w2, . . . , wi, . . . , wn for the respective paths according to $$wi = A \cdot \frac{ri}{\sqrt{\frac{m}{PG}\left(\sum_{j=1}^{n} rj^2 - ri^2\right)} + N}$$

where r1, r2, . . . , ri, . . . , rn are the amplitudes of transmission channel characteristics of n paths, m is the number of spread spectrum communication apparatuses for receiving signals transmitted from said first communication station, PG is the spread factor of the spread spectrum, A is a proportionality constant, and N is the thermal noise and second interference powers.

18. An apparatus according to claim 17, wherein said weighting coefficient generating means of said RAKE receiving section multiplies the thermal noise and second interference powers N by a coefficient α for correcting temporal variation characteristics of the powers N.

* * * * *